(12) United States Patent
Ji et al.

(10) Patent No.: US 12,424,006 B2
(45) Date of Patent: Sep. 23, 2025

(54) IMAGE PROCESSING METHOD AND ELECTRONIC DEVICE

(71) Applicant: VIVO MOBILE COMMUNICATION CO., LTD., Dongguan (CN)

(72) Inventors: Wenbin Ji, Dongguan (CN); Yun Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/955,517

(22) Filed: Sep. 28, 2022

(65) Prior Publication Data

US 2023/0019260 A1     Jan. 19, 2023

Related U.S. Application Data

(63) Continuation of application No. PCT/CN2021/084748, filed on Mar. 31, 2021.

(30) Foreign Application Priority Data

Apr. 3, 2020    (CN) ........................ 202010260899.6

(51) Int. Cl.
    *G06V 30/14*          (2022.01)
    *G06V 30/24*          (2022.01)

(52) U.S. Cl.
    CPC ........ *G06V 30/1444* (2022.01); *G06V 30/248* (2022.01)

(58) Field of Classification Search
    CPC .................. G06V 30/1444; G06V 30/248
    See application file for complete search history.

(56) References Cited

U.S. PATENT DOCUMENTS

| | | | | |
|---|---|---|---|---|
| 2019/0189127 A1* | 6/2019 | Choi | ........................ | G10L 15/22 |
| 2019/0251245 A1* | 8/2019 | Kim | ........................ | G06F 21/40 |
| 2019/0294912 A1 | 9/2019 | Takabayashi et al. | | |
| 2019/0311169 A1 | 10/2019 | Xu et al. | | |
| 2020/0097692 A1* | 3/2020 | Tu | .................... | G06K 19/06037 |

FOREIGN PATENT DOCUMENTS

| | | | | |
|---|---|---|---|---|
| CN | 103685206 A | | 3/2014 | |
| CN | 106231104 A | * | 12/2016 | ............ H04W 76/14 |
| CN | 107590522 A | | 1/2018 | |

(Continued)

OTHER PUBLICATIONS

Extended European Search Report issued in related European Application No. 21778990.8, mailed Jun. 14, 2023, 8 pages.

(Continued)

*Primary Examiner* — Wednel Cadeau
(74) *Attorney, Agent, or Firm* — IPX PLLC

(57) ABSTRACT

Image processing methods and an electronic device are provided. An exemplary image processing method includes: obtaining a target image, where the target image is used for indicating configuration information of a second device; recognizing a first pattern in the target image; determining a first character corresponding to the first pattern, according to a primary element of the first pattern and a secondary element of the first pattern; and recognizing the second device based on the first character.

11 Claims, 10 Drawing Sheets

(56) References Cited

FOREIGN PATENT DOCUMENTS

CN     111598096 A     8/2020

OTHER PUBLICATIONS

Liu Sha et al."A novel asyymmetric three-party based authentication scheme in wearable devices environment", Journal of Network and Computer Application, Academics Press, Oct. 31, 2015, pp. 144-154.
Anonymous, "Code 39—Wikipedia", Mar. 2020, 4 pages.
International Search Report issued in corresponding International Application No. PCT/CN2021/084748, mailed Jul. 2, 2021, 4 pages.

* cited by examiner

Pattern:

Character:   0   1   2   3   4

Pattern:

Character:   5   6   7   8   9

Character string: 168-156-237-125-204-158

Character string: 168-156-237-125-204-158

IMAGE PROCESSING METHOD AND ELECTRONIC DEVICE

CROSS-REFERENCE TO RELATED APPLICATIONS

This application is a continuation of International Application No. PCT/CN2021/084748, filed on Mar. 31, 2021, which claims priority to Chinese Patent Application No. 202010260899.6 filed on Apr. 3, 2020. The entire contents of each of the above-referenced applications are expressly incorporated herein by reference.

TECHNICAL FIELD

Embodiments of the present disclosure relate to the field of communications technologies, and in particular to an image processing method and an electronic device.

BACKGROUND

As science and technology develop rapidly, functions of smart wearable devices such as smart bracelets, smart watches, and smart glasses are increasingly powerful. For example, a wireless connection can be established and data can be transmitted between a smart wearable device and a mobile phone.

Generally, a device can be recognized by identity information such as a Medium Access Control (MAC) address, an International Mobile Equipment Identity (IMEI), and an Integrate Circuit Card Identity (ICCID). When a user intends to establish a wireless connection between a smart wearable device and a mobile phone, the user can trigger the smart wearable device to generate and display a QR code according to identity information of the smart wearable device. Afterwards, the user can scan the QR code with the mobile phone, so that the mobile phone can read the identity information of the smart wearable device and establish a connection with the smart wearable device, so that data can be transmitted between the smart wearable device and the mobile phone.

However, recognition for an identity of an electronic device by scanning a QR code is relatively single, and the user may feel boring about the QR code. In addition, all information in the QR code will be recognized in this method, and some of all the information may not be information required by the user. Therefore, how to enrich the method for recognizing the identity of the electronic device has become a problem to be resolved urgently.

SUMMARY

Embodiments of the present disclosure provide an image processing method and an electronic device.

The embodiments of the present disclosure are implemented as follows:

According to a first aspect, an embodiment of the present disclosure provides an image processing method. The method is applied to a first device. The method includes: obtaining a target image, where the target image is used for indicating configuration information of a second device; recognizing a first pattern in the target image; determining a first character corresponding to the first pattern, according to a primary element of the first pattern and a secondary element of the first pattern; and recognizing the second device based on the first character.

According to a second aspect, an embodiment of the present disclosure provides an image processing method. The method is applied to a second device. The method includes: obtaining configuration information of the second device, where the configuration information includes K characters, and K is a positive integer; generating, for each of the K characters, one pattern corresponding to one character, according to a primary element corresponding to the character and a secondary element corresponding to the character; and arranging K pattern groups corresponding to the K characters in different areas, to generate a target image, where the target image is used for indicating the configuration information.

According to a third aspect, an embodiment of the present disclosure provides an electronic device. The electronic device is a first device. The electronic device includes an obtaining module, a recognizing module, and a determining module. The obtaining module is configured to obtain a target image, where the target image is used for indicating configuration information of a second device; the recognizing module is configured to recognize a first pattern in the target image obtained by the obtaining module; the determining module is configured to determine a first character corresponding to the first pattern, according to a primary element of the first pattern and a secondary element of the first pattern; and the recognizing module is further configured to recognize the second device based on the first character determined by the determining module.

According to a fourth aspect, an embodiment of the present disclosure provides an electronic device. The electronic device is a second device. The electronic device includes an obtaining module and a generating module. The obtaining module is configured to obtain configuration information of the second device, where the configuration information includes K characters, and K is a positive integer; the generating module is configured to generate, for each of the K characters, a pattern corresponding to one character, according to a primary element corresponding to the character and a secondary element corresponding to the character; and the generating module is further configured to arrange K pattern groups corresponding to the K characters in different areas, to generate a target image, where the target image is used for indicating the configuration information.

According to a fifth aspect, an embodiment of the present disclosure provides an electronic device, including a processor, a memory, and a computer program stored in the memory and executable on the processor, and when the computer program is executed by the processor, the steps of the image processing method in the first aspect are implemented.

According to a sixth aspect, an embodiment of the present disclosure provides an electronic device, including a processor, a memory, and a computer program stored in the memory and executable on the processor, and when the computer program is executed by the processor, the steps of the image processing method in the second aspect are implemented.

According to a seventh aspect, an embodiment of the present disclosure provides a communications system, where the communications system includes the electronic device in the third aspect and the electronic device in the fourth aspect. In some embodiments, the communications system includes the electronic device in the fifth aspect and the electronic device in the sixth aspect.

According to an eighth aspect, an embodiment of the present disclosure provides a computer-readable storage medium, where the computer-readable storage medium stores a computer program, and when the computer program is executed by a processor, the steps of the image processing method provided in the first aspect or the second aspect are implemented.

DETAILED DESCRIPTION

Figure 1:
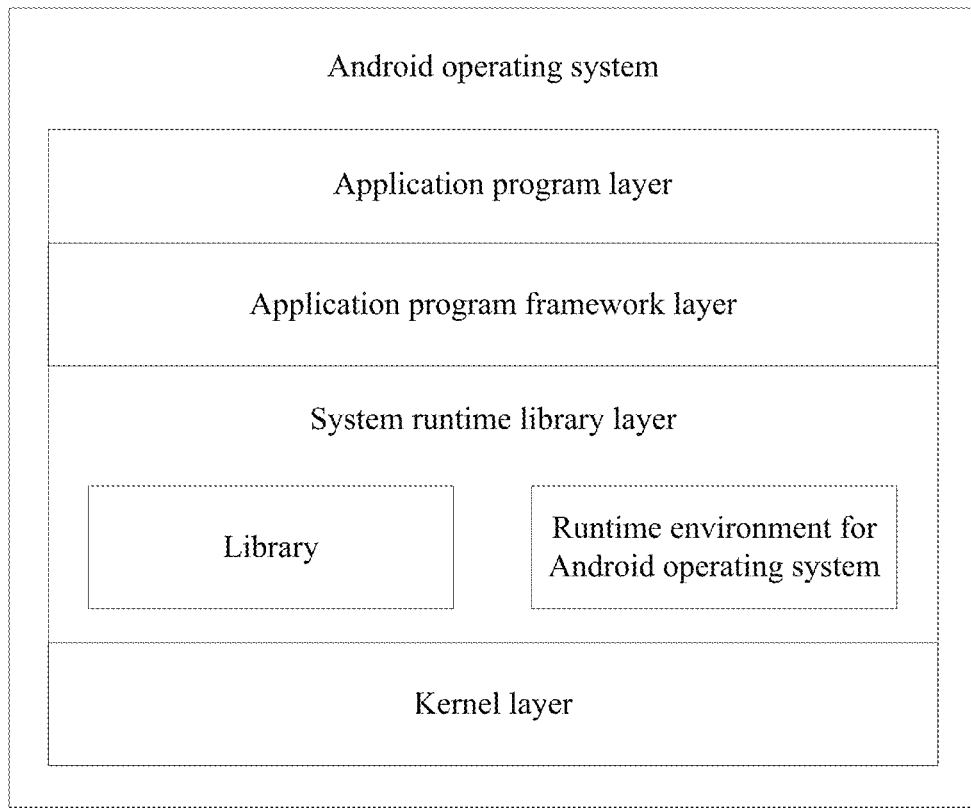
FIG. 1 is a schematic architectural diagram of an Android operating system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. In this specification, a symbol "/" indicates an "or" relationship between associated objects, for example, A/B indicates A or B.

In the specification and claims of the present disclosure, the terms "first", "second", and so on are intended to distinguish between different objects but do not describe a particular order of the objects. For example, a first pattern group, a second pattern group, and the like are used for distinguishing different pattern groups, instead of describing a specific order of pattern groups.

In the embodiments of the present disclosure, the word such as "example" or "for example" is used to represent giving an example, an illustration, or a description. Any embodiment or design solution described as "example" or "for example" in the embodiments of the present disclosure should not be construed as being more advantageous than other embodiments or design solutions. Exactly, use of the term "example" or "for example" is intended to present a concept in a specific manner.

In the descriptions of the embodiments of the present disclosure, unless otherwise stated, "multiple" means two or more, for example, multiple elements mean two or more elements.

Embodiments of the present disclosure provide an image processing method and an electronic device. A first device can obtain a target image displayed by a second device, where the target image is used for indicating configuration information of the second device; recognize a first pattern in the target image; determine a first character corresponding to the first pattern, according to a primary element of the first pattern and a secondary element of the first pattern; and recognize the second device based on the first character. Through this solution, the first device can recognize a pattern in the target image used for indicating the configuration information of the second device, and determine the character corresponding to the pattern, according to the primary element of the pattern and the secondary element of the pattern, so that the first device can recognize the second device according to the first character. Therefore, a method for recognizing an identity of the electronic device is enriched. In addition, because the first device recognizes the second device based on a pattern in the target image, that is, scans the target image step by step, in a case that information obtained by recognition meets requirements, recognition for another pattern in the target image can be stopped. Therefore, this recognition method is more flexible and more energy efficient.

The electronic device in the embodiments of the present disclosure may be an electronic device with an operating system. The operating system may be an Android operating system, or may be an iOS operating system or another possible operating system, which is not limited in the embodiments of the present disclosure.

The Android operating system is used as an example, to describe an applicable software environment for the image processing method provided in the embodiments of the present disclosure.

As shown in FIG. 1, FIG. 1 is a schematic architectural diagram of an Android operating system according to an embodiment of the present disclosure. In FIG. 1, an architecture of the Android operating system includes four layers: an application program layer, an application program framework layer, a system runtime library layer, and a kernel layer (which may be a Linux kernel layer).

The application program layer includes various application programs (including a system application program and a third-party application program) in the Android operating system.

The application program framework layer is an application program framework, and a developer may develop some application programs based on the application program framework layer while conforming to a rule for developing the application program framework.

The system runtime library layer includes a library (also referred to as a system library) and a runtime environment for the Android operating system. The library mainly provides the Android operating system with various resources required by the Android operating system. The runtime environment for the Android operating system is used for providing the Android operating system with a software environment.

The kernel layer is an operating system layer of the Android operating system, and is the lowest layer of software levels of the Android operating system. The kernel layer provides the Android operating system with a core system service and a hardware-related driver based on the Linux kernel.

The Android operating system is used as an example. In the embodiments of the present disclosure, based on the system architecture of the Android operating system shown in FIG. 1, developers may develop a software program that implements the image processing method provided in the embodiments of the present disclosure, so that the image processing method may be performed based on the Android operating system shown in FIG. 1. That is, a processor or the electronic device may run the software program in the Android operating system to implement the image processing method provided in the embodiments of the present disclosure.

The electronic device in this embodiment of the present disclosure may be a terminal device. The terminal device may be a mobile terminal device or a non-mobile terminal device. For example, the mobile terminal device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile terminal device may be a Personal Computer (PC), a television (TV), an automated teller machine, or a self-service machine. This is not limited in this embodiment of the present disclosure.

The image processing method provided in the embodiments of the present disclosure may be performed by the foregoing electronic device, or a functional module and/or a functional entity that can implement the image processing method in the electronic device. This may be determined according to an actual use requirement, and is not limited in the embodiments of the present disclosure.

Embodiments of the present disclosure provide two electronic devices, which may be referred to as a first device and a second device. The first device can be configured to recognize a target image generated by the second device to recognize the second device; and the second device can be configured to generate the target image according to configuration information of the second device. The first device and the second device may be the same type of devices or different types of devices. For example, the first device may be a mobile phone, and the second device may be a smart wearable device, such as a smart bracelet, a smart earphone, a smart watch, or a pair of smart glasses. For another example, the first device may be a tablet computer, and the second device may be a mobile phone.

Embodiment 1

Figure 2:
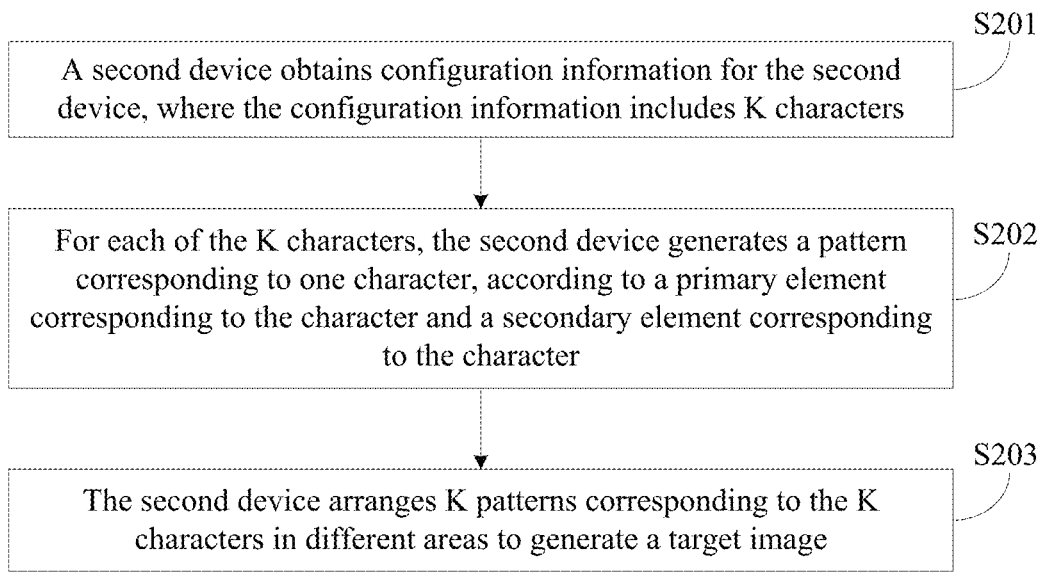
FIG. 2 is a schematic diagram 1 of an image processing method according to an embodiment of the present disclosure.

As shown in FIG. 2, an embodiment of the present disclosure provides an image processing method. The method can be applied to a second device. The method may include the following S201 to S203.

S201: The second device obtains configuration information of the second device, where the configuration information includes K characters.

K is a positive integer.

In some embodiments, the configuration information of the second device may be configured to indicate an identity of the second device.

In some embodiments, the configuration information may be static configuration information. For example, the static configuration information is configured for the second device in factory settings or pre-configured for a Subscriber Identity Module (SIM) card of the second device. In some embodiments, the configuration information may be dynamic configuration information. For example, when register, attachment, multi-mode reselection (e.g., inter-RAT cell reselection), multi-mode handover (e.g., inter-RAT handover), or registration update occur in each second device, the network device may allocate configuration information to the second device through a downlink message (such as a system message).

In this embodiment of the present disclosure, the configuration information of the second device may be obtained in any of the following scenarios:

Scenario 1: The second device receives a first input from a user, and obtains configuration information of the second device in response to the first input. The first input may be used for triggering the second device to obtain the configuration information of the second device.

For example, the first device is a mobile phone and the second device is a smart watch. When the user intends to recognize the smart watch through the mobile phone, the user can trigger, through a voice input to the smart watch, an input to a preset physical button of the smart watch, or an input to a preset function option displayed on the smart watch, the smart watch to obtain the configuration information of the smart watch, such as an MAC address of the smart watch. Then, the smart watch can generate, according to the following S202 and S203, a target image for indicating the configuration information of the second device, and display the target image, so that the mobile phone can recognize the target image through a camera of the mobile phone.

Scenario 2: The second device automatically obtains the configuration information of the second device when a preset condition is met.

In some embodiments, the preset condition may be that register, attachment, multi-mode reselection, multi-mode handover, registration update, or the like occurs.

For example, the second device is a mobile phone. When the second device is turned on, the second device initiates attachment to a network device. Then, the network device can allocate configuration information to the second device through a system message, so that the second device can receive the configuration information sent by the network device, and generate, according to the following S202 and S203, a target image used for indicating the configuration information of the second device, and save the target image in the second device.

In some embodiments, the configuration information of the second device may include at least one of the following:
a MAC address;
an IMEI;
an ICCID;
a Mobile Equipment Identifier (MEID);
an International Mobile Subscriber Identification number (IMSI);

a 5G S-Temporary Mobile Subscription Identifier (5G-S-TMSI); or a Full Inactive-Radio Network Temporary Identifier (Full I-RNTI).

In some embodiments, the configuration information may be stored in the second device, or in a network device providing a network where the second device resides, or in a cloud server, which may be determined according to actual use requirements. This is not limited in this embodiment of the present disclosure.

In some embodiments, the foregoing K characters may include T character strings, and each of the T character strings may include at least one character, that is, all characters of the T character strings may be combined into the K characters. T is a positive integer.

In some embodiments, the T character strings may be binary, quaternary, senary, octal, decimal, hexadecimal, duotricemary, Base64, another possible system, or the like.

In some embodiments, lengths of any two character strings in the T character strings may be the same or different, that is, the number of characters included in any two character strings may be the same or different. This may be determined according to actual use requirements, and is not limited in this embodiment of the present disclosure.

For example, assuming that an MAC address of the second device is a hexadecimal A8-9C-ED-7D-CC-9E, first three character strings A8-9C-ED can be used for indicating a company of the second device, and then last three character strings 7D-CC-9E can be used for indicating a model type of the second device.

S202: For each of the K characters, the second device generates a pattern corresponding to one character, according to a primary element corresponding to the character and a secondary element corresponding to the character.

When the K characters include T character strings, for each character in each of the T character strings, the second device can generate a pattern corresponding to one character, according to a primary element corresponding to the character and a secondary element corresponding to the character, and obtain one pattern group corresponding to each character string.

In this embodiment of the present disclosure, each of the K characters may correspond to a primary element and a secondary element, where the primary element corresponding to one character can be used for defining constitution of a main body of one pattern, and the secondary element corresponding to the character can be used for distinguishing different values. Generally, a primary element of each character in the character string usually keeps unchanged, while a secondary element in each character in the character string will change cyclically, but the secondary element is single. For example, the secondary element can define different values through changes in position and quantity.

In some embodiments, any one of the K characters can be obtained in the following manner:
  (1) the second device obtains a pattern body of one pattern according to a primary element corresponding to one character;
  (2) the second device obtains element change information of one pattern according to a primary element corresponding to one character; or
  (3) the second device generates a pattern corresponding to one character, according to a pattern body of the pattern and element change information of the pattern.

First Implementation Manner

Figure 3:
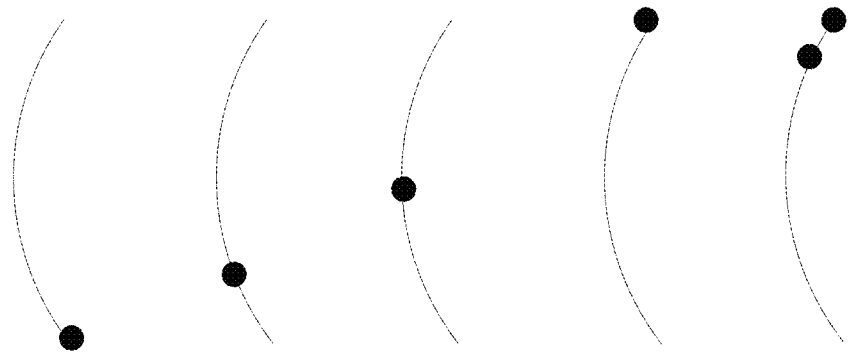
FIG. 3 is a schematic diagram 1 of characters and patterns according to an embodiment of the present disclosure.
Figure 3:
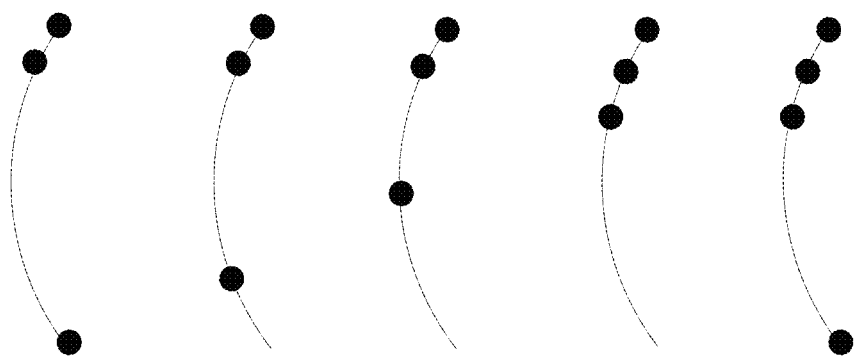

Assuming that primary elements corresponding to the characters are arcs, and secondary elements corresponding to the characters are dots. Different positions of the dots and different numbers of the dots can be used for representing different values. For example, FIG. 3 is a schematic diagram of characters and patterns according to an embodiment of the present disclosure. For character 0-character 9, primary elements of the patterns corresponding to the characters are arcs, and secondary elements of the patterns corresponding to the characters are positions and numbers of dots.

A primary element corresponding to character 0 is an arc, and a secondary element corresponding to character 0 is a dot located at a first end of the arc;
  a primary element corresponding to character 1 is an arc, and a secondary element corresponding to character 1 is a dot close to a ¼ arc length from a first end of the arc;
  a primary element corresponding to character 2 is an arc, and a secondary element corresponding to character 2 is a dot close to a ½ arc length from a first end of the arc;
  a primary element corresponding to character 3 is an arc, and a secondary element corresponding to character 3 is a dot located at a second end of the arc;
  a primary element corresponding to character 4 is an arc, and secondary elements corresponding to character 4 are two dots located at a second end of the arc;
  a primary element corresponding to character 5 is an arc, and secondary elements corresponding to character 5 are one dot located at a first end of the arc and two dots located at a second end of the arc;
  a primary element corresponding to character 6 is an arc, and secondary elements corresponding to character 6 are a dot close to a ¼ arc length from a first end of the arc and two dots located at a second end of the arc;
  a primary element corresponding to character 7 is an arc, and secondary elements corresponding to character 7 are a dot close to a ½ arc length from a first end of the arc and two dots located at a second end of the arc;
  a primary element corresponding to character 8 is an arc, and secondary elements corresponding to character 8 are three dots located at a second end of the arc; and
  a primary element corresponding to character 9 is an arc, and secondary elements corresponding to character 9 are one dot located at a first end of the arc and three dots located at a second end of the arc.

A primary element corresponding to each character among character 0-character 9 and a primary element corresponding to each character may be stored in the second device. For example, assuming that one of the K characters is character 1, the second device can obtain that the primary element corresponding to character 1 is an arc, and determine a pattern body corresponding to character 1; and the second device can obtain that the secondary element corresponding to character 1 is a dot close to a ¼ arc length from the first end of the arc, and determine element change information corresponding to character 1. Afterwards, the second device can generate a pattern corresponding to character 1 as shown in FIG. 3, according to the pattern body and element change information of character 1.

Second Implementation Manner

Figure 4:
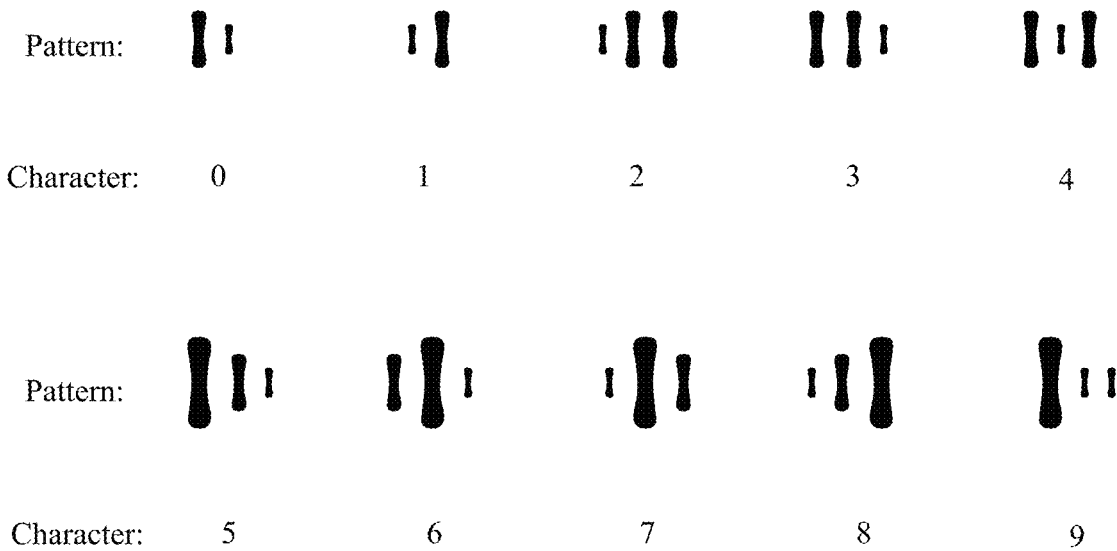
FIG. 4 is a schematic diagram 2 of characters and patterns according to an embodiment of the present disclosure.

Assuming that primary elements corresponding to characters are vertical lines, and secondary elements corresponding to the characters are lengths of the vertical lines and the number of the vertical lines, and different values can be represented by changing the lengths of the vertical lines and the number of the vertical lines. For example, FIG. 4 is another schematic diagram of characters and patterns according to an embodiment of the present disclosure. For character 0-character 9, primary elements of the patterns corresponding to the characters are vertical lines, and secondary elements of the patterns corresponding to the characters are lengths and the number of the vertical lines.

A primary element corresponding to character 0 is a vertical line, and secondary elements corresponding to character 0 are two vertical lines, where a first vertical line has a second length, and a second vertical line has a third length;

- a primary element corresponding to character 1 is a vertical line, and secondary elements corresponding to character 1 are two vertical lines, where a first vertical line has the third length, and a second vertical line has the second length;
- a primary element corresponding to character 2 is a vertical line, and secondary elements corresponding to character 2 are three vertical lines, where a first vertical line has the third length, and a second vertical line and a third vertical line have the second length;
- a primary element corresponding to character 3 is a vertical line, and secondary elements corresponding to character 3 are three vertical lines, where a first vertical line and a second vertical line have the second length, and a third vertical line has the third length;
- a primary element corresponding to character 4 is a vertical line, and secondary elements corresponding to character 4 are three vertical lines, where a first vertical line and a third vertical line have the second length, and a second vertical line has the third length;
- a primary element corresponding to character 5 is a vertical line, and secondary elements corresponding to character 5 are three vertical lines, where a first vertical line has a first length, a second vertical line has the second length, and a third vertical line has the third length;
- a primary element corresponding to character 6 is a vertical line, and secondary elements corresponding to character 6 are three vertical lines, where a first vertical line has the second length, a second vertical line has the first length, and a third vertical line has the third length;
- a primary element corresponding to character 7 is a vertical line, and secondary elements corresponding to character 7 are three vertical lines, where a first vertical line has the third length, a second vertical line has the first length, and a third vertical line has the second length;
- a primary element corresponding to character 8 is a vertical line, and secondary elements corresponding to character 8 are three vertical lines, where a first vertical line has the third length, a second vertical line has the second length, and a third vertical line has the first length; and
- a primary element corresponding to character 9 is a vertical line, and secondary elements corresponding to character 9 are three vertical lines, where a first vertical line has the first length, and a second vertical line and a third vertical line have the third length.

The first length is greater than the second length, and the second length is greater than the third length.

Element information of character 0-character 9 may be stored in the second device: a primary element corresponding to each character and a primary element corresponding to each character. For example, assuming that one of the K characters is character 5, the second device can obtain, according to the element information, that the primary element corresponding to character 5 is a vertical line, thereby determining a pattern body corresponding to character 5; and the second device can obtain, according to the element information, that the secondary elements corresponding to character 5 are three vertical lines, where the first vertical line has the first length, the second vertical line has the second length, and the third vertical line has the third length, thereby determining element change information corresponding to character 5. Afterwards, the second device can generate, according to the pattern body and element change information of character 5, a pattern corresponding to character 5 as shown in FIG. 4.

After the second device obtains a pattern corresponding to each of the K characters in the foregoing method, the second device may continue to perform the following S203. In some embodiments, when the K characters include T character strings, after the second device obtains one pattern corresponding to each character in one character string in the foregoing method, the second device can obtain a pattern group corresponding to the character string. Afterwards, the second device can obtain T pattern groups corresponding to the T character strings in the foregoing method, and perform the following S203.

S203. The second device arranges K patterns corresponding to the K characters in different areas to generate a target image.

The target image can be used for indicating configuration information of the second device.

In some embodiments, when the K characters include the T character strings, the T character strings correspond to the T pattern groups, and each of the T pattern groups corresponds to one arrangement area, and the arrangement area corresponding to each pattern group and an arrangement position of each pattern in each pattern group may be determined according to a preset arrangement rule. Therefore, after the second device obtains the T pattern groups, for each pattern group in the T pattern groups, an arrangement area corresponding to each pattern group in a layer can be arranged according to a preset arrangement rule, and then the target image is obtained finally.

In some embodiments, after the second device generates the target image, the second device can directly (immediately) display the target image on a screen of the second device. In some embodiments, the second device can store the target image in the second device or a cloud server, and does not display target image temporarily.

An embodiment of the present disclosure provides an image processing method, where a second device can obtain configuration information of a second device, and the configuration information includes K characters; for each of the K characters, generate a pattern corresponding to one character, according to a primary element corresponding to the character and a secondary element corresponding to the character; and arrange K patterns corresponding to the K characters in different areas, so as to generate a target image. Through this solution, since the second device can respectively generate a pattern corresponding to each character, according to the primary element and secondary element corresponding to each character of the K characters, thereby generating the target image, the target image can be generated in diversified manners. In addition, since the present disclosure can generate a pattern corresponding to each character step by step, the target image can be generated in a more flexible manner.

Figure 5:
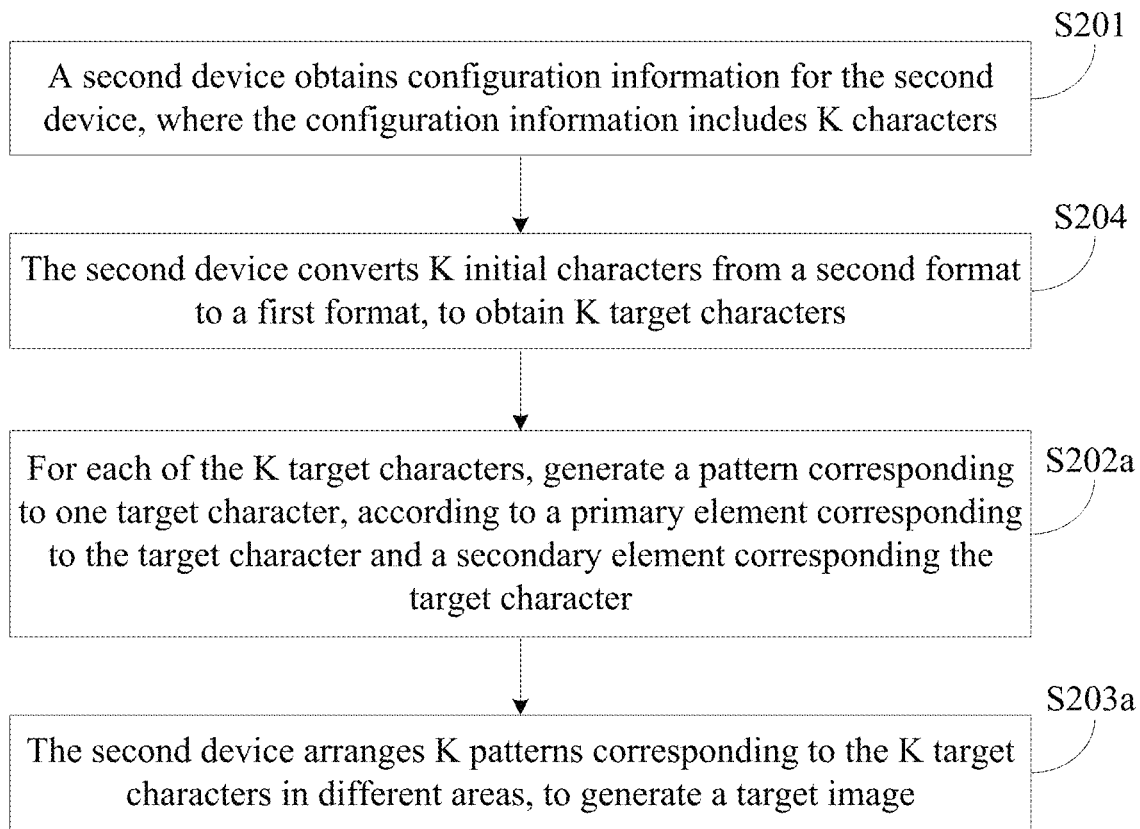
FIG. 5 is a schematic diagram 2 of an image processing method according to an embodiment of the present disclosure.

In some embodiments, the K characters included in the foregoing configuration information may be K initial characters. With reference to FIG. 2, as shown in FIG. 5, after the foregoing S201, the image processing method provided according to an embodiment of the present disclosure may further include the following S204. Correspondingly, the foregoing S202 may be implemented by the following S202a, and the foregoing S203 may be implemented by the following S203a.

S204. The second device converts K initial characters from a second format to a first format, to obtain K target characters.

In this embodiment of the present disclosure, the first format may be a preset format.

In some embodiments, the first format may be a first standard, and the second format may be a second standard different from the first standard.

For example, the first format is decimal and the second format is a hexadecimal. Assuming that an MAC address obtained by the second device is a hexadecimal A8-9C-ED-7D-CC-9E, six initial character strings successively include a character string A8, a character string 9C, a character string ED, a character string 7D, a character string CC, and a character string 9E. Afterwards, the second device can convert the MAC address from the hexadecimal to a decimal 168-156-237-125-204-158, and 6 target strings successively include a character string 168, a character string 156, a character string 237, a character string 125, a character string 204, and a character string 158.

In some embodiments, each initial character string and each target character string corresponding to each initial character string may include a same or a different number of characters, which is not limited in this embodiment of the present disclosure.

S202a: For each of the K target characters, generate a pattern corresponding to one target character, according to a primary element corresponding to the target character and a secondary element corresponding the target character.

For specific description of the foregoing S202a, reference may be made to the relevant description of the foregoing S202, which will not be repeated herein again.

S203a: The second device arranges K patterns corresponding to the K target characters in different areas, to generate a target image.

In some embodiments, the K patterns may be arranged in an area where multiple concentric circular rings are located, and each circular ring may include at least one pattern, and each circular ring may include a starting identifier (such as an arrow). M arcs in each circular ring can be displayed in whole or in part; or some of the M arcs in each circular ring is a first display mode, and the rest of the M arcs in each circular ring is a second display mode. The first display mode and the second display mode may be different in colors of the arcs, different in line types of the arcs, or different in thicknesses of the arcs.

Figure 6:
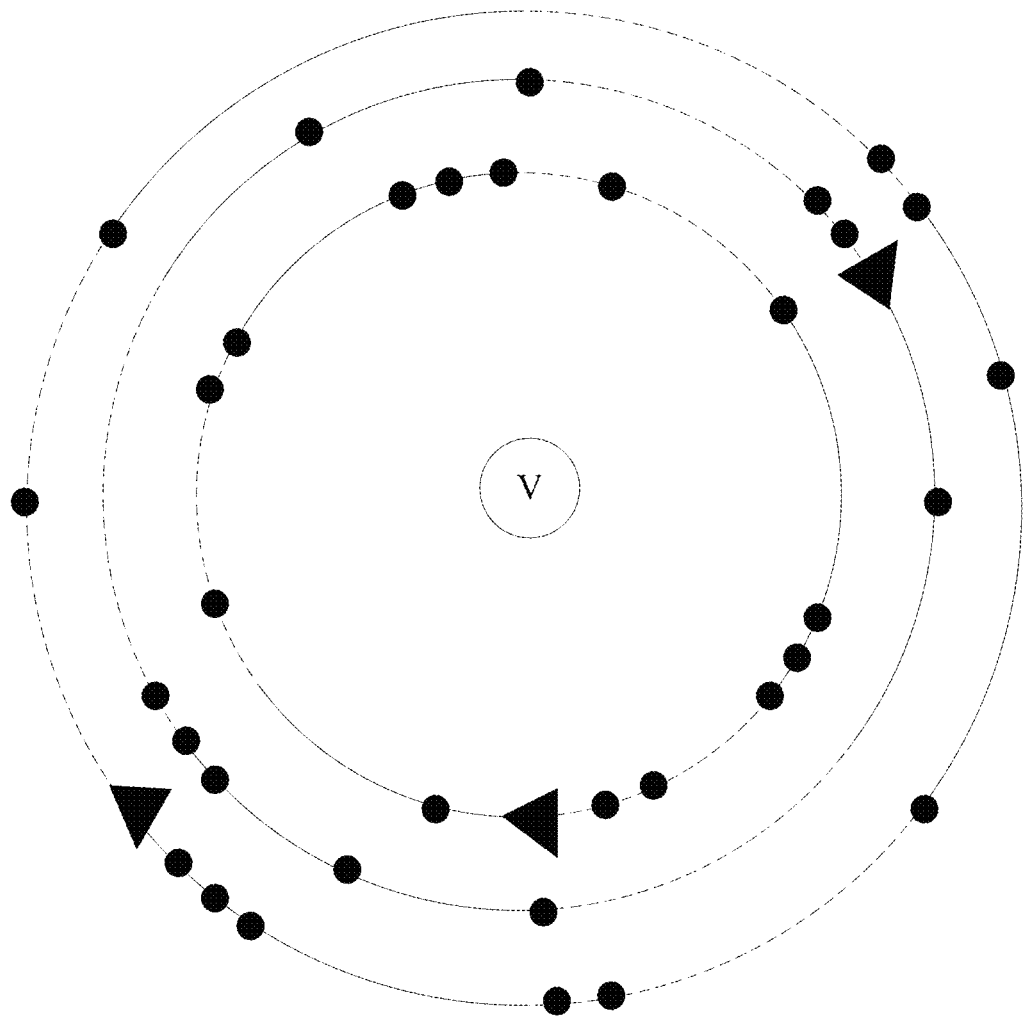
FIG. 6 is a schematic diagram 1 of a target image according to an embodiment of the present disclosure.

For example, after the second device converts six initial character strings, A8-9C-ED-7D-CC-9E, into six target character strings, 168-156-237-125-204-158, if an electronic device obtains six pattern groups in the first implementation manner in the foregoing S202, the second device can firstly arrange character string 168 and character string 156 in a first inner ring respectively, arcs of character 1, character 8, and character 5 are represented by solid lines, and arcs of character 6, character 1, and character 6 are represented by dashed lines. Afterwards, the second device can arrange character string 237 and character string 125 in a second inner ring respectively, arcs of character 2, character 7, and character 2 are represented by solid lines, and arcs of character 3, character 1, and character 5 are represented by dashed lines. Further, the second device can arrange character string 204 and character string 158 in a third outer ring respectively, arcs of character 2, character 4, and character 5 are represented by dashed lines, and arcs of character 0,
character 1, and character 8 are represented by solid lines. After these character strings are arranged at different positions of three circular rings, a target image as shown in FIG. 6 can be obtained.

In some embodiments, the K patterns may be sequentially arranged at different positions of a circular ring, and the circular ring may include a starting identifier (such as an arrow).

Figure 7:
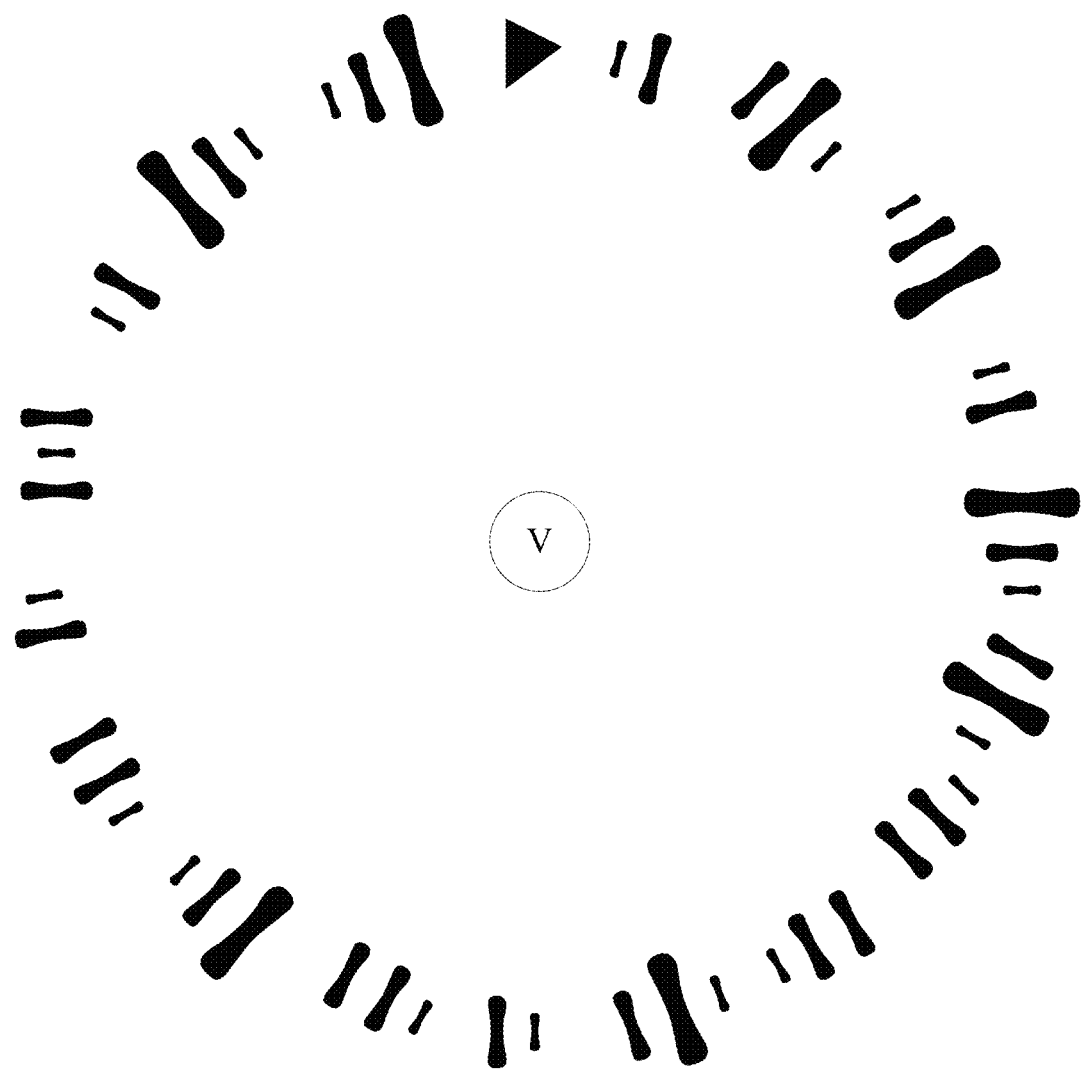
FIG. 7 is a schematic diagram 2 of a target image according to an embodiment of the present disclosure.

For example, after the second device converts six initial character strings, A8-9C-ED-7D-CC-9E, into six target strings, 168-156-237-125-204-158, if the electronic device obtains six pattern groups in the second implementation manner in the foregoing S202, the second device may take a position where the initial identifier is located as an initial position, and sequentially arranges character string 168, character string 156, character string 237, character string 125, character string 204, and character string 158 in a clockwise direction at different positions of a circular ring, so that a target image as shown in FIG. 7 can be obtained.

In the image processing method provided in this embodiment of the present disclosure, when a format of the K initial characters is not a first format, the K initial characters are converted into the first format, so that the format of the characters can be normalized, thereby helping the first device recognize the target image generated by the second device.

In some embodiments, after the foregoing S203 or S203a, the image processing method provided in this embodiment of the present disclosure may further include the following S205.

S205: In a case that the second device establishes a connection with the first device, the second device receives first information sent by the first device, or sends second information to the first device.

In some embodiments, the first information may be attribute information of the first device, file data of the first device, a call request received by the first device, a notification message received by the first device, and the like.

Further, the attribute information of the first device may include at least one of the following: a wallpaper style of the first device, a meeting schedule in the first device, a memo in the first device, an alarm clock in the first device, and the like.

In some embodiments, the second information may be attribute information of the second device, file data of the second device, a call request received by the second device, a notification message received by the second device, and the like.

Further, the attribute information of the second device may include at least one of the following: a wallpaper style of the second device, a meeting schedule in the second device, a memo in the second device, an alarm clock in the second device, and the like.

In an exemplary scenario, after the second device generates the target image, the second device may directly display the target image on a screen of the second device. Afterwards, the second device may collect the target image displayed by the second device to recognize the target image, and the second device is recognized according to a recognized pattern. In a case that recognition for the second device based on the pattern is successful, the second device establishes a connection with the first device. Further, the second device may send second information to the first device, or the first device may send second information to the second device.

In another exemplary scenario, after the second device generates the target image, the second device may store the target image. When the user intends to enable the second device to establish a connection with the first device, the user can trigger, through a second input to the second device, the second device to obtain the target image, and display the target image on the screen of the second device. Afterwards, the second device may collect the target image displayed by the second device to recognize the target image, and the second device is recognized according to a recognized pattern. In a case that recognition for the second device based on the pattern is successful, the second device establishes a connection with the first device. Further, the second device may send second information to the first device, or the first device may send second information to the second device.

In the image processing method provided in this embodiment of the present disclosure, in a case that the first device recognizes the second device based on the target image successfully, a connection can be established between the two devices, so that data can be transmitted between the two devices.

Embodiment 2

Figure 8:
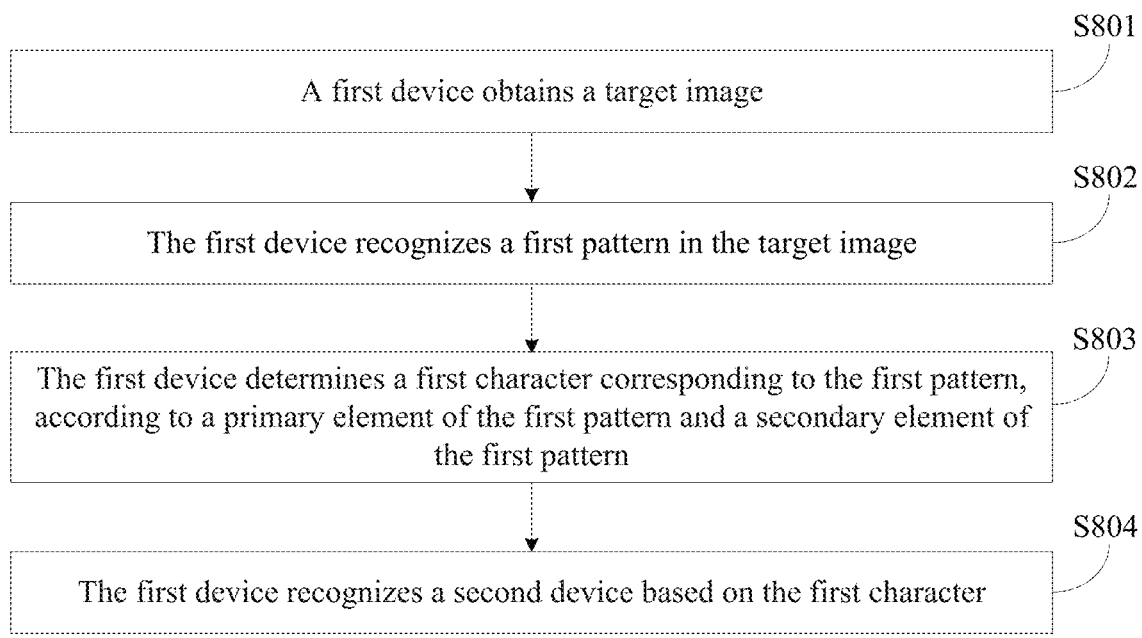
FIG. 8 is a schematic diagram 3 of an image processing method according to an embodiment of the present disclosure.

As shown in FIG. 8, an embodiment of the present disclosure provides an image processing method. The method can be applied to a first device. The method may include the following S801 to S804.

S801: A first device obtains a target image.

The target image can be used for indicating configuration information of a second device.

For description of the target image, reference may be made to the description in the foregoing embodiment, and details are not repeated herein again.

In this embodiment of the present disclosure, in a manner, in a case that the second device displays the target image, a user points a camera of the first device to the target image, and the first device can collect the target image displayed by the second device through the camera, and recognize the target image. In another manner, the second device can first receive the target image sent by the second device, and then recognize the target image.

S802. The first device recognizes a first pattern in the target image.

In some embodiments, when the target image includes multiple pattern groups, the first device can recognize the target image to obtain a first pattern group, where the first pattern group includes N patterns. N is a positive integer.

In some embodiments, the target image may include at least one image area. Each image area may include at least one pattern. A preset recognition algorithm may be stored in the first device. After the electronic device collects the target image, the electronic device can perform step-by-step recognition on at least one image area of the target image according to the preset recognition algorithm.

The "recognizing a first pattern in the target image" may include: recognizing a first image area in at least one image area, to obtain the first pattern. In some embodiments, when the target image includes multiple image areas, the first device may sequentially recognize multiple image areas according to a preset recognition sequence of multiple image areas. For example, the first image area may be a first image area to be recognized among the multiple image areas.

It should be noted that, in this embodiment of the present disclosure, a sequence in which the first device recognizes patterns in the target image may be the same as a sequence in which the second device generates patterns in the target image.

S803: The first device determines a first character corresponding to the first pattern, according to a primary element of the first pattern and a secondary element of the first pattern.

In some embodiments, when the target image includes multiple pattern groups, for each of N patterns in a first pattern group, the first device may determine a character corresponding to one pattern, according to a primary element of the pattern and a secondary element of the pattern, so as to obtain a first character string.

In some embodiments, the first device determines the character corresponding to the first pattern according to the primary element of the first pattern and the secondary element of the first pattern, which can be implemented by the following (a) to (c):

(a) recognizing a pattern body of the first pattern, to obtain the primary element of the first pattern;

(b) recognizing element change information of the first pattern, to obtain the secondary element of the first pattern; and (c) determining a character corresponding to the first pattern according to the primary element of the first pattern and the secondary element of the first pattern.

Figure 9:
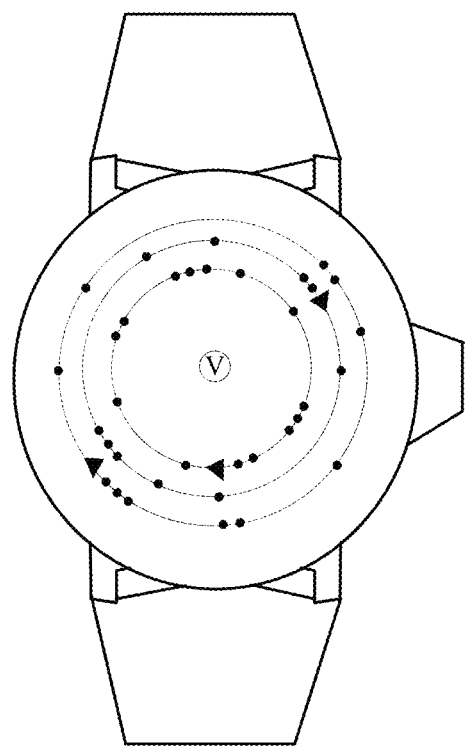
FIG. 9 is a schematic diagram 1 showing that an electronic device displays a target image according to an embodiment of the present disclosure.

For example, for illustration purpose, assuming that the first device is a mobile phone, the second device is a smart watch, and the smart watch displays a target image shown in FIG. 9, when the user points a camera of the first device to the target image, the first device may collect, through a camera of the first device, the target image displayed by the second device. Then, the first device may first determine that the target image includes three circular rings according to a preset recognition algorithm, and then perform step-by-step recognition on an area where a first inner ring of the target image is located, to obtain a first pattern group. Afterwards, the first device can recognize a pattern body of each pattern in the first pattern group, and obtain that a primary element of the pattern is an arc; recognize positions and the number of dots corresponding to each pattern, so as to obtain a secondary element of each pattern; and then determine a character corresponding to each pattern, according to a primary element of each pattern and a secondary element of each pattern. Further, after the first device determines the character corresponding to each pattern, the first device can obtain first character strings 168-156.

Figure 10:
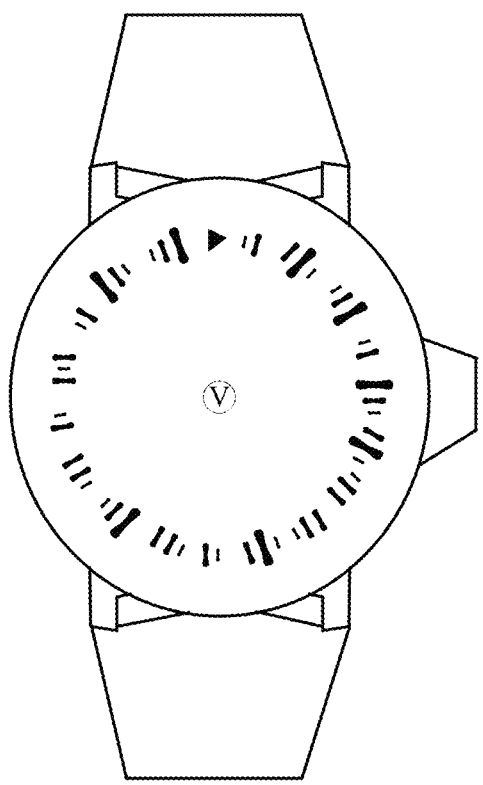
FIG. 10 is a schematic diagram 2 showing that the electronic device displays a target image according to an embodiment of the present disclosure.

For example, for illustration purpose, assuming that the first device is a mobile phone, the second device is a smart watch, and the smart watch displays a target image shown in FIG. 10, when the user points the camera of the first device to the target image, the first device may collect, through the camera of the first device, the target image displayed by the second device. Afterwards, the first device can first determine, according to a preset recognition algorithm, that the target image includes a circular ring, and then perform step-by-step recognition on an area corresponding to 0:00 to 0:40 in the circular ring, to obtain the first pattern. Further, the first device can obtain a primary element of the first pattern and a secondary element of the first pattern through lengths of vertical lines and the number of vertical lines corresponding to the first pattern; and then determine a first character 1 corresponding to the first pattern, according to the primary element of the first pattern and the secondary element of the first pattern.

S804: The first device recognizes the second device based on the first character.

In some embodiments, after the foregoing S803 and before the foregoing S804, the image processing method provided in this embodiment of the present disclosure may further include: the first device converts the first character from a first format to a second format, to obtain a third character. Correspondingly, S804 may include: the first device recognizes the second device based on the third character.

For example, a first character string includes the first character and the first device recognizes the second device based on the first character string. Assuming that first character strings 168-156 obtained according to FIG. 9 is decimal, the first device can convert the first character strings 168-156 from decimal to hexadecimal, to obtain third character strings A8-9C. Afterwards, the first device can recognize the second device based on the third character strings A8-9C.

For another example, a first character string includes the first character and the first device recognizes the second device based on the first character string. Assuming that a first character string 168 obtained according to FIG. 10 is in decimal, the first device can convert the first character string 168 from decimal to hexadecimal, to obtain a third character string A8. Afterwards, the first device can recognize the second device based on the third character string A8.

An embodiment of the present disclosure provides an image processing method, where a first device can recognize a pattern in a target image used for indicating configuration information of a second device, and determine a character corresponding to the pattern, according to a primary element of the pattern and a secondary element of the pattern, so that the first device can recognize the second device according to the first character. Therefore, an identity of an electronic device can be recognized in diversified manners. In addition, because the first device recognizes the second device based on a pattern in the target image, that is, scans the target image step by step, when information obtained by recognition meets requirements, recognition for another pattern in the target image can be stopped. Therefore, this recognition method is more flexible and more energy efficient.

Figure 11:
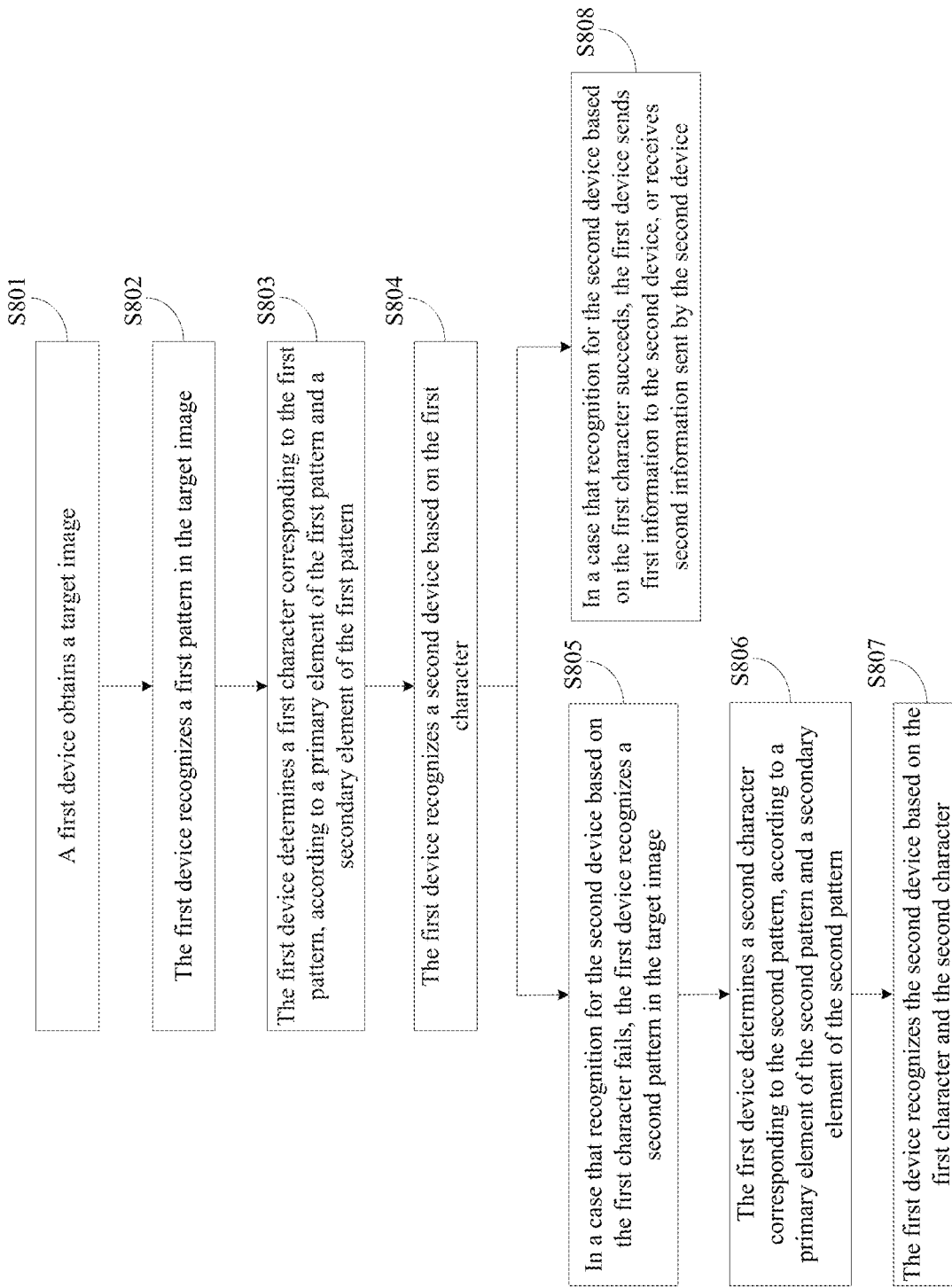
FIG. 11 is a schematic diagram 4 of an image processing method according to an embodiment of the present disclosure.

In some embodiments, in a case that the first device fails to recognize the second device based on the first character, the first device may continue to perform image recognition on the target image. For example, with reference to FIG. 8, as shown in FIG. 11, after the foregoing S804, the image processing method provided in this embodiment of the present disclosure may further include the following S805 to S807.

S805: In a case recognition for the second device based on the first character fails, the first device recognizes a second pattern in the target image.

In some embodiments, the "recognizing a second pattern in the target image" may include: recognizing a second image area in at least one image area to obtain the second pattern.

In some embodiments, if the second device is recognized based on a pattern group, in a case that recognition for the second device based on the first character string fails, the first device recognizes the target image and obtains a second pattern group, where the second pattern group includes M patterns. M is a positive integer.

S806: The first device determines a second character corresponding to the second pattern, according to a primary element of the second pattern and a secondary element of the second pattern.

For an implementation manner in the foregoing S806, reference may be made to the relevant description in the foregoing S803, which will not be repeated herein again.

For example, the target image shown in FIG. 10 is still used as an example for illustration purpose. The first device can first determine, according to a preset recognition algorithm, that the target image includes a circular ring, and then perform step-by-step recognition on an area corresponding to 0:00 to 0:40 in the circular ring, to obtain a first pattern 1 corresponding to the first pattern. In a case that the first device fails to recognize the second device based on the first character, the first device can continue to perform step-by-step recognition on an area corresponding to 0:40 to 1:20 in the circular ring, so as to obtain the primary element of the second pattern and the secondary element of the second pattern. Afterwards, the first device may determine a first character 6 corresponding to the second pattern, according to the primary element of the second pattern and the secondary element of the first pattern.

S807: The first device recognizes the second device based on the first character and the second character.

For an implementation manner in S805 to S807, reference may be made to the relevant descriptions of S802 to S804, which will not be repeated herein again.

In some embodiments, when a second pattern group includes M patterns, for each pattern in the M patterns, the first device determines a character corresponding to one pattern, according to a primary element of the pattern and a secondary element of the pattern, and obtains a second character string. Afterwards, the first device recognizes the second device based on the first character string and the second character string.

For example, the foregoing FIG. 10 is still used for illustration purpose. In a case that recognition for the second device based on the first character string fails, the first device may continue to recognize a second image area in at least one image area, for example, an area corresponding to 2 o'clock to 4 o'clock, to obtain a second pattern group. Then, the first device determines a character corresponding to each pattern in the second pattern group, so as to obtain a second character string 156. Afterwards, the first device recognizes the second device based on character strings 168-156, or recognizes the second device based on character strings A8-9C after standard conversion.

Assuming that an MAC address of the second device is a hexadecimal A8-9C-ED-7D-CC-9E, character strings A8-9C-ED are a company identifier, and character strings 7D-CC-9E are a device identifier. In a case that recognition for the second device based on the first character string 168 and the second character string 156 fails, the first device may continue to recognize a third image area in at least one image area, for example, an area corresponding to 4 o'clock to 6 o'clock, to obtain a third pattern group. Then, the first device determines a character corresponding to each pattern in the third pattern group, so as to obtain a character string 237. Afterwards, the first device recognizes the second device based on character strings 168-156-237, or recognizes the second device based on character strings A8-9C-ED after standard conversion. If the first device recognizes a company identifier of the second device based on the character strings 168-156-237 or the character strings A8-9C-ED, the first device may display company information of the second device on the screen, that is, recognition for the company of the second device succeeds. If the user intends to know information of the second device, the first device can be triggered to continue to recognize the target image; otherwise, the first device can stop image recognition.

In the image processing method provided in this embodiment of the present disclosure, the first device can perform step-by-step recognition on the target icon displayed by the second device. Therefore, if information obtained through recognition does not meet requirements, the first device can continue to perform next recognition; or if information obtained through recognition meets requirements, the first device can stop image recognition. Accordingly, this recognition method is more flexible and more energy-efficient.

In some embodiments, in a case that recognition for the second device based on the first character succeeds, a connection can be established and data can be sent between the first device and the second device. For example, as shown in FIG. 11, after the foregoing S804, the image processing method provided in this embodiment of the present disclosure may further include the following S808.

S808: In a case that recognition for the second device based on the first character succeeds, the first device sends first information to the second device, or receives second information sent by the second device.

For an implementation manner in the foregoing S808, reference may be made to the relevant description in the foregoing S205, which will not be repeated herein again.

In some embodiments, the first information may be attribute information of the first device, file data of the first device, a call request received by the first device, a notification message received by the first device, and the like. The attribute information of the first device may include at least one of the following: a wallpaper style of the first device, a meeting schedule in the first device, a memo in the first device, an alarm clock in the first device, and the like.

In some embodiments, the second information may be attribute information of the second device, file data of the second device, a call request received by the second device, a notification message received by the second device, and the like. The attribute information of the second device may include at least one of the following: a wallpaper style of the second device, a meeting schedule in the second device, a memo in the second device, an alarm clock in the second device, and the like.

It should be noted that, in S808, for example, for illustration purpose, the second device is recognized successfully based on the first character. It can be understood that, in a case that recognition for the second device based on the first character fails, the first device can continue to recognize the target image to determine another character, and then recognize the second device based on all recognized characters, until recognition for the second device succeeds, and then the first device stops recognition for the target image.

In the image processing method provided in this embodiment of the present disclosure, in a case that the first device recognizes the second device based on the target image successfully, a connection can be established between the two devices, so that data can be transmitted between the two devices.

It should be noted that, in the embodiments of the present disclosure, the image processing methods shown in the foregoing accompanying drawings are illustrated with reference to one of the accompanying drawings in the embodiments of the present disclosure. In an implementation, the image processing methods shown in the foregoing accompanying drawings may be further implemented with reference to any other accompanying drawings that may be combined shown in the foregoing embodiments. Details are not described herein again.

Figure 12:
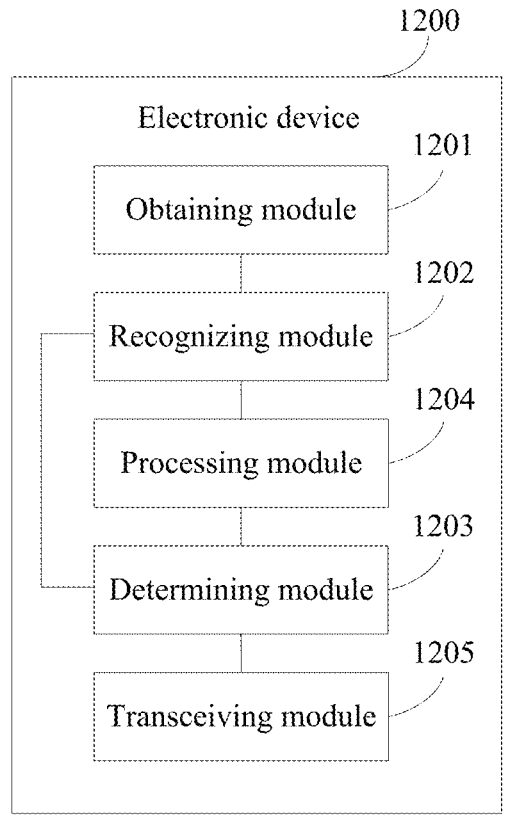
FIG. 12 is a schematic structural diagram 1 of an electronic device according to an embodiment of the present disclosure.

As shown in FIG. 12, an embodiment of the present disclosure provides an electronic device 1200. The electronic device may be a first device. The electronic device may include an obtaining module 1201, a recognizing module 1202, and a determining module 1203. The obtaining module 1201 can be configured to obtain a target image, where the target image can be used for indicating configuration information of a second device. The recognizing module 1202 can be configured to recognize a first pattern in the target image obtained by the obtaining module 1201. The determining module 1203 can be configured to determine a first character corresponding to the first pattern, according to a primary element of the first pattern and a secondary element of the first pattern. The recognizing module 1202 can further be configured to recognize the second device based on the first character determined by the determining module 1203.

In some embodiments, the recognizing module 1202 can further be configured to recognize a second pattern in the target image, in a case that recognition for the second device based on the first character fails after the second device is recognized based on the first character. The determining module 1203 can further be configured to determine a second character corresponding to the second pattern according to a primary element of the second pattern and a secondary element of the second pattern. The recognizing module 1202 can further be configured to recognize the second device based on the first character and the second character.

In some embodiments, the recognizing module 1202 can further be configured to recognize a pattern body of the first pattern, before the determining module 1203 determines the first character corresponding to the first pattern, according to the primary element of the first pattern and the secondary element of the first pattern, to obtain the primary element of the first pattern; and to recognize element change information of the first pattern, to obtain the secondary element of the first pattern.

In some embodiments, the target image may include at least one image area. The recognizing module 1202 can be configured to recognize a first image area in at least one image area, to obtain the first pattern.

In some embodiments, as shown in FIG. 12, the electronic device provided in this embodiment of the present disclosure may further include a processing module 1204. The processing module 1204 can be configured to convert, after the determining module 1203 determines the first character and before the recognizing module 1202 recognizes the second device based on the first character, the first character from a first format to a second format, to obtain a third character. The recognizing module 1202 can be configured to recognize the second device based on the third character obtained by the processing module 1204.

In some embodiments, as shown in FIG. 12, the electronic device provided in this embodiment of the present disclosure may further include a transceiving module 1205. The transceiving module 1205 can be configured to send first information to the second device or receive second information sent by the second device, in a case that the recognizing module 1202 recognizes the second device based on the first character successfully.

The electronic device provided in this embodiment of the present disclosure can implement the processes implemented by the electronic device in the foregoing method embodiment. To avoid repetition, details are not described herein again.

An electronic device provided in an embodiment of the present disclosure is the first device. The first device can obtain a target image displayed by a second device, where the target image is used for indicating configuration information of the second device; recognizing a first pattern in the target image; determining a first character corresponding to the first pattern, according to a primary element of the first pattern and a secondary element of the first pattern; and recognizing the second device based on the first character. Through this solution, the first device can recognize a pattern in the target image used for indicating the configuration of the second device, and determine the character corresponding to the pattern, according to the primary element of the pattern and the secondary element of the pattern, so that the first device can recognize the second device according to the first character. Therefore, a method for recognizing an identity of the electronic device is enriched. In addition, because the first device recognizes the second device based on a pattern in the target image, that is, scans the target image step by step, when information obtained by recognition meets requirements, recognition for another pattern in the target image can be stopped. Therefore, this recognition method is more flexible and more energy efficient.

Figure 13:
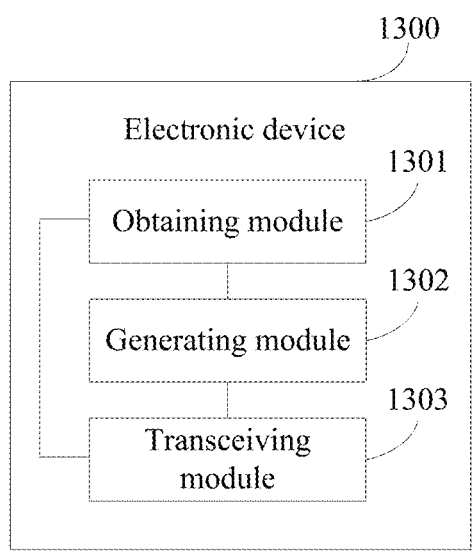
FIG. 13 is a schematic structural diagram 2 of the electronic device according to an embodiment of the present disclosure.

As shown in FIG. 13, an embodiment of the present disclosure provides an electronic device 1300. The electronic device may be a second device. The electronic device includes an obtaining module 1301 and a generating module 1302. The obtaining module 1301 can be configured to obtain configuration information of the second device, where the configuration information includes K characters, and K is a positive integer. The generating module 1302 can be configured to generate, for each of the K characters, a pattern corresponding to one character, according to a primary element corresponding to the character and a secondary element corresponding to the character. The generating module 1302 can further be configured to arrange K pattern groups corresponding to the K characters in different areas, to generate a target image, where the target image can be used for indicating the configuration information.

In some embodiments, the generating module 1302 can be configured to obtain a pattern body of the pattern according to the primary element corresponding to the character; obtain element change information of the pattern according to the secondary element corresponding to the character; and generate the pattern corresponding to the character, according to the pattern body of the pattern and the element change information of the pattern.

In some embodiments, as shown in FIG. 13, the electronic device provided in this embodiment of the present disclosure may further include a transceiving module 1303. The transceiving module 1303 can be configured to receive, in a case that the second device establishes a connection with the first device, first information sent by the first device, or sends second information to the first device.

The electronic device provided in this embodiment of the present disclosure can implement the processes implemented by the electronic device in the foregoing method embodiment. To avoid repetition, details are not described herein again.

An electronic device provided in an embodiment of the present disclosure is the second device, where the second device can obtain configuration information of the second device, and the configuration information includes K characters; for each of the K characters, generate a pattern corresponding to one character, according to a primary element corresponding to the character and a secondary element corresponding to the character; and arrange K patterns corresponding to the K characters in different areas, so as to generate a target image. Through this solution, since the second device can respectively generate a pattern corresponding to each character, according to the primary element and secondary element corresponding to each character of the K characters, thereby generating the target image. Therefore, the target image can be generated in diversified manners. In addition, since the present disclosure can generate a pattern corresponding to each character step by step, the target image can be generated in a more flexible manner.

Figure 14:
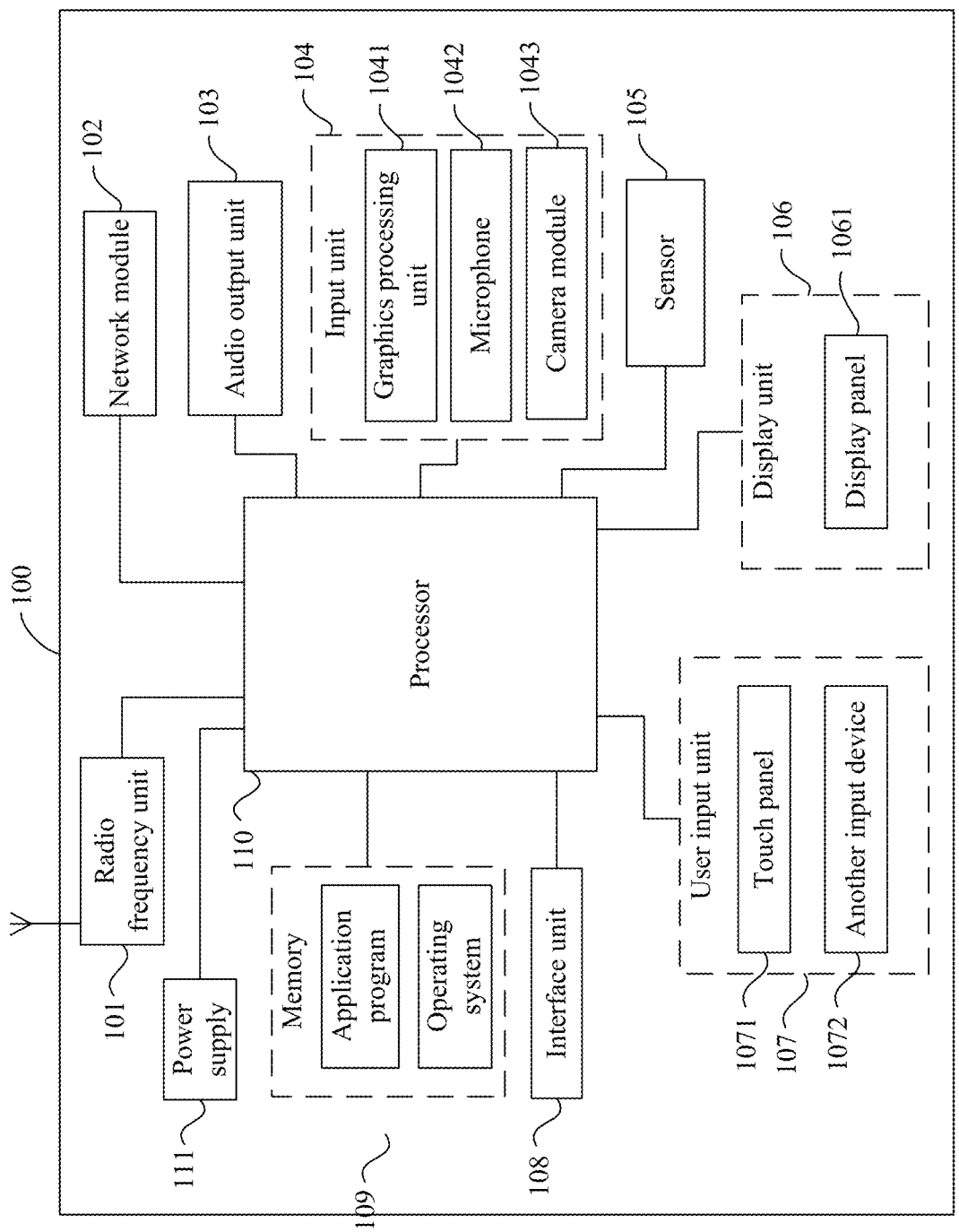
FIG. 14 is a schematic diagram of hardware of the electronic device according to an embodiment of the present disclosure.

FIG. 14 is a schematic structural diagram of hardware of an electronic device according to an embodiment of the present disclosure. The electronic device may be a terminal device, such as a mobile phone. As shown in FIG. 14, the electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that a structure of the electronic device shown in FIG. 14 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like. It should be noted that the electronic device 100 provided in this embodiment of the present disclosure may be configured to control multiple UEs, and the multiple UEs reside in at least one network.

In a manner, the electronic device shown in FIG. 14 is a first device. The processor 110 can be configured to obtain a target image, where the target image can be used for indicating configuration information of a second device; can be used for recognizing a first pattern in the target image; can be used for determining a first character corresponding to the first pattern, according to a primary element of the first pattern and a secondary element of the first pattern; and can be used for recognizing the second device based on the first character.

An electronic device provided in an embodiment of the present disclosure is the first device. The first device can obtain a target image displayed by a second device. The target image is used for indicating configuration information of the second device; recognizing a first pattern in the target image; determining a first character corresponding to the first pattern, according to a primary element of the first pattern and a secondary element of the first pattern; and recognizing the second device based on the first character. Through this solution, the first device can recognize a pattern in the target image used for indicating the configuration information of the second device, and determine the character corresponding to the pattern, according to the primary element of the pattern and the secondary element of the pattern, so that the first device can recognize the second device according to the first character. Therefore, a method for recognizing an identity of the electronic device is enriched. In addition, because the first device recognizes the second device based on a pattern in the target image, that is, scans the target image step by step, when information obtained by recognition meets requirements, recognition for another pattern in the target image can be stopped. Therefore, this recognition method is more flexible and more energy efficient.

In another manner, the electronic device shown in FIG. 14 is the second device. The processor 110 can be configured to obtain configuration information of the second device, where the configuration information includes K characters, and K is a positive integer; be configured to generate, for each of the K characters, one pattern corresponding to one character, according to a primary element corresponding to the character and a secondary element corresponding to the character; and be configured to arrange K pattern groups corresponding to the K characters in different areas, to generate a target image, where the target image can be used for indicating the configuration information.

An electronic device provided in an embodiment of the present disclosure is the second device, where the second device can obtain configuration information of the second device, and the configuration information includes K characters; for each of the K characters, generate a pattern corresponding to one character, according to a primary element corresponding to the character and a secondary element corresponding to the character; and arrange K patterns corresponding to the K characters in different areas, so as to generate a target image. Through this solution, since the second device can respectively generate a pattern corresponding to each character, according to the primary element and secondary element corresponding to each character of the K characters, thereby generating the target image, the target image can be generated in diversified manners. In addition, since the present disclosure can generate a pattern corresponding to each character step by step, the target image can be generated in a more flexible manner.

It should be understood that, in this embodiment of the present disclosure, the radio frequency unit 101 may be configured to receive and send information or a signal in a call process. In some embodiments, after receiving downlink data from a base station, the radio frequency unit 101 sends the downlink data to the processor 110 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communications system.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal and output the audio signal as a sound. Moreover, the audio output unit 103 can further provide audio output related to a function performed by the electronic device 100 (for example, call signal received sound and message received sound). The audio output unit 103 includes a speaker, a buzzer, a telephone receiver, and the like.

The input unit 104 is configured to receive an audio signal or a video signal. The input unit 104 may include a Graphics Processing Unit (GPU) 1041, a microphone 1042, and a camera module 1043. The graphics processing unit 1041 processes image data of a static picture or a video obtained by an image capturing apparatus (for example, a camera) in an image capturing mode or a video capturing mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output. The camera module 1043 can collect an image, and can process the collected image into a digital signal, and a processed image can be output in a format of being sent to a mobile communication base station through the radio frequency unit 101.

The electronic device 100 further includes at least one sensor 105, for example, a light sensor, a motion sensor, and another sensor. In some embodiments, the light sensor includes an ambient light sensor and a proximity sensor. The ambient light sensor may adjust luminance of the display panel 1061 based on brightness of ambient light. The proximity sensor may turn off the display panel 1061 and/or backlight when the electronic device 100 moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include the display panel 1061, and the display panel 1061 may be configured in a form of a Liquid Crystal Display (LCD), an Organic Light-Emitting Diode (OLED), or the like.

The user input unit 107 may be configured to receive input digital or character information, and generate key signal input related to a user setting and function control of the electronic device. In some embodiments, the user input unit 107 includes a touch panel 1071 and another input device 1072. The touch panel 1071 is also referred to as a touchscreen, and may collect a touch operation performed by a user on or near the touch panel 1071 (such as an operation performed by a user on or near the touch panel 1071 by using any proper object or accessory, such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented as a resistive type, a capacitive type, an infrared type, a surface acoustic wave type, or the like. The user input unit 107 may include other input devices 1072 in addition to the touch panel 1071. In some embodiments, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although the touch panel 1071 and the display panel 1061 in FIG. 14 are configured as two independent components to implement input and output functions of the electronic device, in some embodiments, the touch panel 1071 and the display panel 1061 may be integrated to implement the input and output functions of the electronic device. Details are not limited herein.

The interface unit 108 is an interface for connecting an external apparatus with the electronic device 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive an input (for example, data information and power) from an external apparatus and transmit the received input to one or more elements in the electronic device 100 or may be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (for example, a sound play function or an image display function), and the like. The data storage area may store data (for example, audio data or an address book) or the like created based on use of a mobile phone. In addition, the memory 109 may include a high-speed random access memory, and may further include a nonvolatile memory, for example, at least one magnetic disk storage device, a flash storage device, or another volatile solid-state storage device.

The processor 110 is a control center of the electronic device, connects all parts of the entire electronic device by using various interfaces and lines, and performs various functions of the electronic device and data processing by running or executing a software program and/or a module that are/is stored in the memory 109 and by invoking data stored in the memory 109, to monitor the electronic device entirely. The processor 110 may include one or more processing units. In some embodiments, the processor 110 may be integrated with an application processor and a modem processor. The application processor mainly processes an operating system, a user first interface, an application program, and the like, and the modem processor mainly processes wireless communication. It can be understood that the modem processor may not be integrated into the processor 110.

The electronic device 100 may further include the power supply 111 (such as a battery) supplying power to each component. In some embodiments, the power supply 111 may be logically connected to the processor 110 by using a power management system, so as to implement functions such as charging management, discharging management and power consumption management by using the power management system.

In addition, the electronic device 100 includes some function modules not shown. Details are not described herein.

In some embodiments, an embodiment of the present disclosure further provides an electronic device, including a processor 110 shown in FIG. 14, a memory 109, and a computer program that is stored in the memory 109 and that can be run on the processor 110. When the computer program is executed by the processor 110, the processes of the foregoing method embodiments are implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the foregoing method embodiment are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing implementation manners, and the foregoing implementation manners are only illustrative and not restrictive. Under the enlightenment of the present disclosure, a person of ordinary skill in the art can make many forms without departing from the purpose of the present disclosure and the protection scope of the claims, and all of these fall within the protection of the present disclosure.

The invention claimed is:

1. An image processing method, performed by a first device, comprising:
    obtaining a target image, wherein the target image is used for indicating configuration information of a second device, wherein the configuration information comprises a plurality of characters and the target image comprises a plurality of image areas, each image area corresponding to one of the plurality of characters;
    recognizing a first pattern in a first image area of the target image, comprising a primary element and a secondary element, wherein the primary element indicates that the first pattern comprises at least one vertical line, and the secondary element indicates the number of the vertical lines and the length of each vertical line of the first pattern;
    determining a first character corresponding to the first pattern, according to the primary element of the first pattern and the secondary element of the first pattern;
    recognizing the second device based on the first character;

determining the recognition for the second device based on the first character fails or succeeds; and in response to the recognition for the second device based on the first character fails:
- recognizing a second pattern in a second image area of the target image,
- determining a second character corresponding to the second pattern, according to a primary element of the second pattern and a secondary element of the second pattern, and
- recognizing the second device based on both the first character and the second character jointly, wherein the first image area is different from the second image area.

2. The image processing method according to claim 1, wherein before the determining a first character corresponding to the first pattern, according to a primary element of the first pattern and a secondary element of the first pattern, the method further comprises:
- recognizing a pattern body of the first pattern, to obtain the primary element of the first pattern; and
- recognizing element change information of the first pattern, to obtain the secondary element of the first pattern.

3. The image processing method according to claim 1, wherein the target image comprises at least one image area; and recognizing the first pattern in the target image comprises:
- recognizing a first image area in the at least one image area, to obtain the first pattern.

4. The image processing method according to claim 2, wherein the target image comprises at least one image area; and the recognizing a first pattern in the target image comprises:
- recognizing a first image area in the at least one image area, to obtain the first pattern.

5. An image processing method, performed by a second device, comprising:
- obtaining configuration information of the second device, wherein the configuration information comprises K characters, and K is a positive integer and greater than 1;
- for each of the K characters, generating a pattern corresponding to one character, according to a primary element corresponding to the character and a secondary element corresponding to the character, wherein the pattern comprises a primary element and a secondary element, wherein the primary element indicates that the pattern comprises at least one vertical line and the secondary element indicates the number of the vertical lines and the length of each vertical line of the pattern; and
- arranging K patterns corresponding to the K characters in different image areas, to generate a target image, wherein the target image is used for indicating the configuration information and each image area corresponds to one of the K characters, wherein in response to a first device recognizes the second device based on a first one of the K characters determined according to a first image area fails, the first device recognizes a second pattern in a second image area of the target image, determines a second character corresponding to the second pattern, according to a primary element of the second pattern and a secondary element of the second pattern, and recognizes the second device based on both the first character and the second character jointly, wherein the first image area is different from the second image area.

6. The image processing method according to claim 5, wherein the generating a pattern corresponding to one character, according to a primary element corresponding to the character and a secondary element corresponding to the character comprises:
- obtaining a pattern body of the pattern according to the primary element corresponding to the character;
- obtaining element change information of the pattern according to the secondary element corresponding to the character; and
- generating the pattern corresponding to the character, according to the pattern body of the pattern and the element change information of the pattern.

7. An electronic device, comprising a first device comprising a memory having a computer program stored thereon; a processor, wherein the computer program, when executed by the processor, causes the processor to perform operations comprising:
- obtaining a target image, wherein the target image is used for indicating configuration information of a second device, wherein the configuration information comprises a plurality of characters and the target image comprises a plurality of image areas, each image area corresponding to one of the plurality of characters;
- recognizing a first pattern in a first image area of the target image, comprising a primary element and a secondary element, wherein the primary element indicates that the first pattern comprises at least one vertical line, and the secondary element indicates the number of the vertical lines and the length of each vertical line of the first pattern;
- determining a first character corresponding to the first pattern, according to the primary element of the first pattern and the secondary element of the first pattern;
- recognizing the second device based on the first character determining the recognition for the second device based on the first character fails or succeeds; and
- in response to the recognition for the second device based on the first character fails:
  - recognizing a second pattern in a second image area of the target image,
  - determining a second character corresponding to the second pattern, according to a primary element of the second pattern and a secondary element of the second pattern, and
  - recognizing the second device based on both the first character and the second character jointly, wherein the first image area is different from the second image area.

8. The electronic device according to claim 7, wherein the operations further comprise:
- recognizing a pattern body of the first pattern, according to the primary element of the first pattern and the secondary element of the first pattern, to obtain the primary element of the first pattern; and
- recognizing element change information of the first pattern, to obtain the secondary element of the first pattern.

9. The electronic device according to claim 7, wherein the target image comprises at least one image area; and
the operations further comprise: recognizing a first image area in the at least one image area, to obtain the first pattern.

10. The image processing method of claim 1, wherein the primary element of the second pattern remains the same as the primary element of the first pattern; and the secondary element of the second pattern differs from the secondary element of the first pattern.

11. The electronic device according to claim 8, wherein the target image comprises at least one image area, and the operations further comprise: recognizing a first image area in the at least one image area, to obtain the first pattern.

* * * * *